US012572779B2

(12) United States Patent
Lee et al.

(10) Patent No.: US 12,572,779 B2
(45) Date of Patent: *Mar. 10, 2026

(54) INTERFACE NEURAL NETWORK

(71) Applicants: SAMSUNG ELECTRONICS CO., LTD., Suwon-si (KR); UNIVERSITAET ZUERICH, Zurich (CH)

(72) Inventors: Jun Haeng Lee, Hwaseong-si (KR); Tobi Delbruck, Zurich (CH); Eric Hyunsurk Ryu, Hwaseong-si (KR)

(73) Assignees: SAMSUNG ELECTRONICS CO., LTD., Suwon-si (KR); UNIVERSITAET ZUERICH, Zurich (CH)

( * ) Notice: Subject to any disclaimer, the term of this patent is extended or adjusted under 35 U.S.C. 154(b) by 1257 days.

This patent is subject to a terminal disclaimer.

(21) Appl. No.: 17/091,837

(22) Filed: Nov. 6, 2020

(65) Prior Publication Data

US 2021/0056394 A1 Feb. 25, 2021

Related U.S. Application Data

(63) Continuation of application No. 15/247,160, filed on Aug. 25, 2016, now Pat. No. 10,867,236.

(30) Foreign Application Priority Data

Apr. 15, 2016 (KR) ........................ 10-2016-0046426

(51) Int. Cl.
 *G06N 3/045* (2023.01)
(52) U.S. Cl.
 CPC .................................. *G06N 3/045* (2023.01)

(58) Field of Classification Search
 USPC .......................................................... 706/25
 See application file for complete search history.

(56) References Cited

U.S. PATENT DOCUMENTS 5,448,684 A * 9/1995 Holt ..................... G06N 3/0463
 706/26
5,822,077 A * 10/1998 Sasaki ............... H04N 1/00891
 340/435

(Continued)

FOREIGN PATENT DOCUMENTS

KR 100413382 B1 12/2003
KR 100757500 B1 9/2007

OTHER PUBLICATIONS

Alex Krizhevsky et al., "ImageNet Classification with Deep Convolutional Neural Networks" Advances in neural information processing systems, 2012, Total 9 pages.

(Continued)

*Primary Examiner* — Omar F Fernandez Rivas
*Assistant Examiner* — Em N Trieu
(74) *Attorney, Agent, or Firm* — Sughrue Mion, PLLC

(57) ABSTRACT

An operation method of a neural network, a training method, and a signal processing apparatus are provided. The operation method includes receiving an output signal from a first neural network, and converting a first feature included in the output signal to a second feature configured to be input to a second neural network, based on a conversion rule controlling conversion between a feature to be output from the first neural network and a feature to be input to the second neural network. The operation method further includes generating an input signal to be input to the second neural network, based on the second feature, and transmitting the input signal to the second neural network.

28 Claims, 9 Drawing Sheets

(56) References Cited

U.S. PATENT DOCUMENTS

| | | | |
|---|---|---|---|
| 6,070,139 | A | 5/2000 | Miyazawa et al. |
| 6,735,579 | B1 | 5/2004 | Woodall |
| 7,103,460 | B1 * | 9/2006 | Breed .................... G07C 5/008 |
| | | | 706/15 |
| 7,962,429 | B2 | 6/2011 | Adams et al. |
| 8,095,484 | B2 | 1/2012 | Cheng et al. |
| 10,275,688 | B2 * | 4/2019 | Jiang ...................... G06N 3/045 |
| 2002/0152030 | A1 * | 10/2002 | Schultz ................... E21B 47/00 |
| | | | 702/6 |
| 2004/0036261 | A1 * | 2/2004 | Breed ................. B60R 21/0136 |
| | | | 280/735 |
| 2005/0114280 | A1 | 5/2005 | Rising, III |
| 2006/0076508 | A1 * | 4/2006 | Nakasugi ............ H01J 37/3174 |
| | | | 250/491.1 |
| 2014/0250039 | A1 | 9/2014 | Modha |
| 2015/0026100 | A1 | 1/2015 | Kudritskiy |
| 2015/0088398 | A1 * | 3/2015 | Cui ..................... F02D 41/2432 |
| | | | 701/101 |
| 2015/0106314 | A1 | 4/2015 | Birdwell et al. |
| 2015/0278686 | A1 | 10/2015 | Cardinaux et al. |
| 2015/0293976 | A1 | 10/2015 | Guo et al. |
| 2016/0217369 | A1 * | 7/2016 | Annapureddy ........ G06N 3/082 |
| 2017/0124409 | A1 | 5/2017 | Choi et al. |
| 2018/0300610 | A1 * | 10/2018 | Pye ........................ G06N 3/045 |
| 2019/0101605 | A1 | 4/2019 | Hyun et al. |

OTHER PUBLICATIONS

Andrej Karpathy and Li Fei-Fei, "Deep Visual-Semantic Alignments for Generating Image Descriptions", Proceedings of the IEEE Conference on Computer Vision and Pattern Recognition, 2015, pp. 3128-3137.

Liu, Yang et al.; Cascading Model based Back Propagation Neural Network in Enabling Precise Classification; IEEE; 2016 12th International Conference on Natural Computation, Fuzzy Systems and Knowledge Discovery (ICNC-FSKD); pp. 7-11. (year: 2016).

Schlemper, Jo et al.; A Deep Cascade of Convolutional Neural Networks for Dynamic MR Image Reconstruction; IEEE Transactions on Medical Imaging, vol. 37, No. 2, Feb. 2018; pp. 491-503. (Year: 2018).

Happel, Bart L. M. et al.; The Design and Evolution of Modular Neural Network Architectures; Neural Networks, 1994, 7, 985-1004; pp. 1-34. (Year: 1994).

Communication issued Jun. 26, 2024 by the Korean Intellectual Property Office in Korean Patent Application No. 10-2016-0046426.

* cited by examiner

FIG. 1

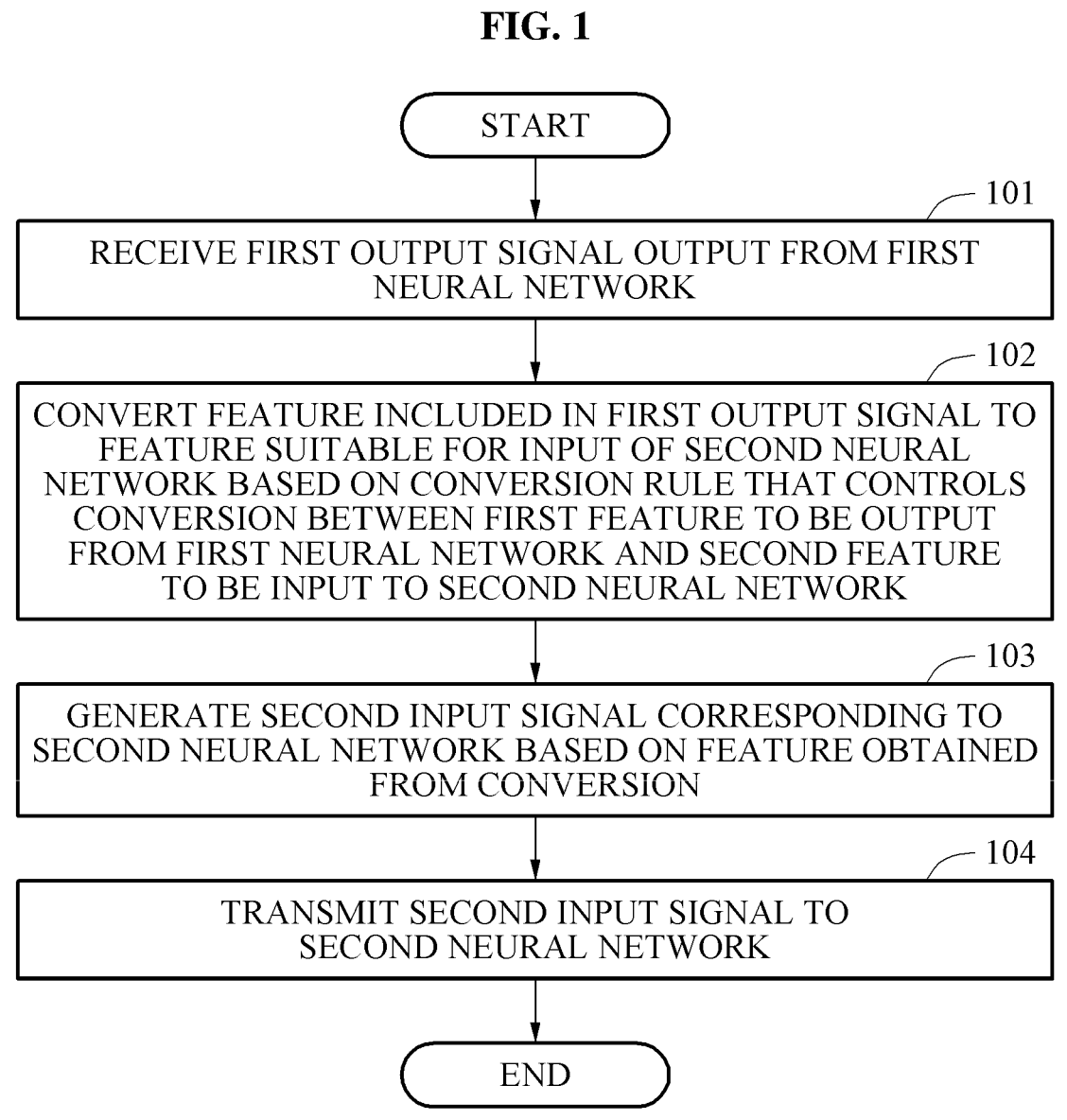

START

— 101

RECEIVE FIRST OUTPUT SIGNAL OUTPUT FROM FIRST
NEURAL NETWORK

— 102

CONVERT FEATURE INCLUDED IN FIRST OUTPUT SIGNAL TO
FEATURE SUITABLE FOR INPUT OF SECOND NEURAL
NETWORK BASED ON CONVERSION RULE THAT CONTROLS
CONVERSION BETWEEN FIRST FEATURE TO BE OUTPUT
FROM FIRST NEURAL NETWORK AND SECOND FEATURE
TO BE INPUT TO SECOND NEURAL NETWORK

— 103

GENERATE SECOND INPUT SIGNAL CORRESPONDING TO
SECOND NEURAL NETWORK BASED ON FEATURE OBTAINED
FROM CONVERSION

— 104

TRANSMIT SECOND INPUT SIGNAL TO
SECOND NEURAL NETWORK

END

FIG. 7A

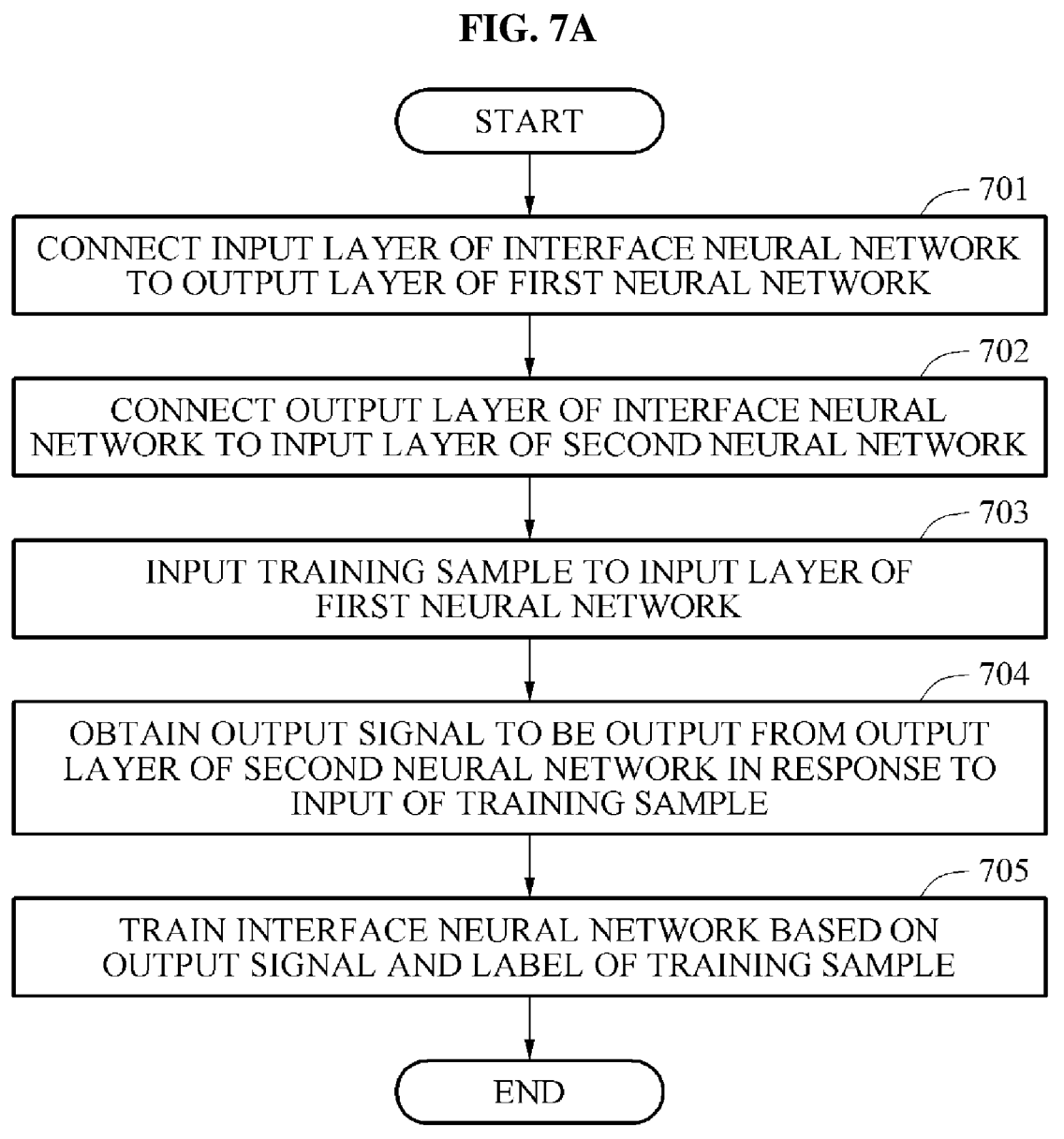

START

701

CONNECT INPUT LAYER OF INTERFACE NEURAL NETWORK TO OUTPUT LAYER OF FIRST NEURAL NETWORK

702

CONNECT OUTPUT LAYER OF INTERFACE NEURAL NETWORK TO INPUT LAYER OF SECOND NEURAL NETWORK

703

INPUT TRAINING SAMPLE TO INPUT LAYER OF FIRST NEURAL NETWORK

704

OBTAIN OUTPUT SIGNAL TO BE OUTPUT FROM OUTPUT LAYER OF SECOND NEURAL NETWORK IN RESPONSE TO INPUT OF TRAINING SAMPLE

705

TRAIN INTERFACE NEURAL NETWORK BASED ON OUTPUT SIGNAL AND LABEL OF TRAINING SAMPLE

END

INTERFACE NEURAL NETWORK

CROSS-REFERENCE TO RELATED APPLICATION

This is a continuation application of U.S. patent application Ser. No. 15/247,160, filed Aug. 25, 2016, in the U.S. Patent and Trademark Office, which claims priority from Korean Patent Application No. 10-2016-0046426 filed on Apr. 15, 2016, in the Korean Intellectual Property Office, the disclosure of which is incorporated herein by reference in its entirety.

BACKGROUND

1. Field

Methods and apparatuses consistent with example embodiments relate to an operation method of a neural network and a signal processing apparatus using the neural network.

2. Description of the Related Art

A neural network is used in various fields of technology. Thus, research is being conducted on technology for a smooth interaction among a plurality of neural networks.

SUMMARY

Example embodiments may address at least the above problems and/or disadvantages and other disadvantages not described above. Also, the example embodiments are not required to overcome the disadvantages described above, and an example embodiment may not overcome any of the problems described above.

According to an aspect of an example embodiment, there is provided an operation method of a neural network, the operation method including receiving an output signal from a first neural network, and converting a first feature included in the output signal to a second feature configured to be input to a second neural network, based on a conversion rule controlling conversion between a feature to be output from the first neural network and a feature to be input to the second neural network. The operation method further includes generating an input signal to be input to the second neural network, based on the second feature, and transmitting the input signal to the second neural network.

The first feature may include a first feature vector, and the second feature may include a second feature vector.

The neural network may include an interface neural network to which the conversion rule is applied.

An input dimension of the neural network may correspond to an output dimension of the first neural network, and an output dimension of the neural network may correspond to an input dimension of the second neural network.

The conversion rule may include parameters of the neural network that are optimized.

The operation method may further include, in response to the first neural network being replaced with a third neural network, updating the conversion rule to control conversion between a feature to be output from the third neural network and the feature to be input to the second neural network, and in response to the second neural network being replaced with a fourth neural network, updating the conversion rule to control conversion between the feature to be output from the first neural network and a feature to be input to the fourth neural network.

The updating the conversion rule to control the conversion between the feature to be output from the third neural network and the feature to be input to the second neural network may include adjusting parameters of the neural network, based on a relationship between the feature to be output from the third neural network and the feature to be input to the second neural network, and the updating the conversion rule to control the conversion between the feature to be output from the first neural network and the feature to be input to the fourth neural network may include adjusting parameters of the neural network, based on a relationship between the feature to be output from the first neural network and the feature to be input to the fourth neural network.

The third neural network and the first neural network may be distinguished with respect to any one or any combination of an input modality, an output modality, an input dimension, an output dimension, an input feature, and an output feature, and the fourth neural network and the second neural network may be distinguished with respect to any one or any combination of an input modality, an output modality, an input dimension, an output dimension, an input feature, and an output feature.

In response to the first neural network being replaced with the third neural network, a type of an input signal based on the updated conversion rule may be identical to a type of the input signal based on the conversion rule, and in response to the second neural network being replaced with the fourth neural network, a type of an output signal based on the updated conversion rule may be identical to a type of the output signal based on the conversion rule.

The operation method may further include, in response to a third neural network being additionally connected to the neural network, generating a conversion rule controlling conversion between a feature to be output from the third neural network and the feature to be input to the second neural network.

The first neural network may be configured to extract, as the first feature, a feature vector from an object, and the second neural network may be configured to identify the object, based on the input signal.

The first neural network may be configured to determine, as the first feature, a command vector of an actuator, and the second neural network may be configured to control the actuator, based on the input signal.

According to an aspect of another example embodiment, there is provided a training method including connecting an input layer of an interface neural network to an output layer of a first neural network, connecting an output layer of the interface neural network to an input layer of a second neural network, and inputting a training sample to an input layer of the first neural network. The training method further includes obtaining an output signal from an output layer of the second neural network in response to the inputting of the training sample, and training the interface neural network, based on the output signal and a label of the training sample.

An input dimension of the interface neural network may correspond to an output dimension of the first neural network, and an output dimension of the interface neural network may correspond to an input dimension of the second neural network.

The interface neural network may be trained to convert a first feature included in an output signal that is output from the first neural network to a second feature configured to be input to the second neural network, generate an input signal to be input to the second neural network, based on the second feature, and transmit the input signal to the second neural network.

The first neural network may be configured to extract, as the first feature, a feature vector from an object, and the second neural network may be configured to identify the object, based on the input signal.

The first neural network may be configured to determine, as the first feature, a command vector of an actuator, and the second neural network may be configured to control the actuator, based on the input signal.

A non-transitory computer-readable medium may store a program including instructions to control a processor to perform the method.

According to an aspect of another example embodiment, there is provided a signal processing apparatus including a processor configured to receive an output signal from a first neural network, and convert a first feature included in the output signal to a second feature configured to be input to a second neural network, based on a conversion rule controlling conversion between a feature to be output from the first neural network and a feature to be input to the second neural network. The processor is further configured to generate an input signal to be input to the second neural network, based on the second feature, and transmit the input signal to the second neural network.

According to an aspect of another example embodiment, there is provided an operation method of a neural network, the operation method including receiving an output signal from a first neural network, and converting a first feature of an object and included in the output signal to a second feature of the object and configured to be input to a second neural network. The operation method further includes generating an input signal to be input to the second neural network, the input signal including the second feature of the object, and transmitting the input signal to the second neural network.

The operation method further includes converting a first command of an actuator and included in the output signal to a second command of the actuator and configured to be input to the second neural network, and generating the input signal to be input to the second neural network, the input signal including the second command of the actuator.

BRIEF DESCRIPTION OF THE DRAWINGS

The above and other aspects will be more apparent and more readily appreciated from the following detailed description of example embodiments, with reference to the accompanying drawings of which:

FIG. 1 is a flowchart illustrating an operation method of a neural network, according to an example embodiment;

4

Figure 7B:
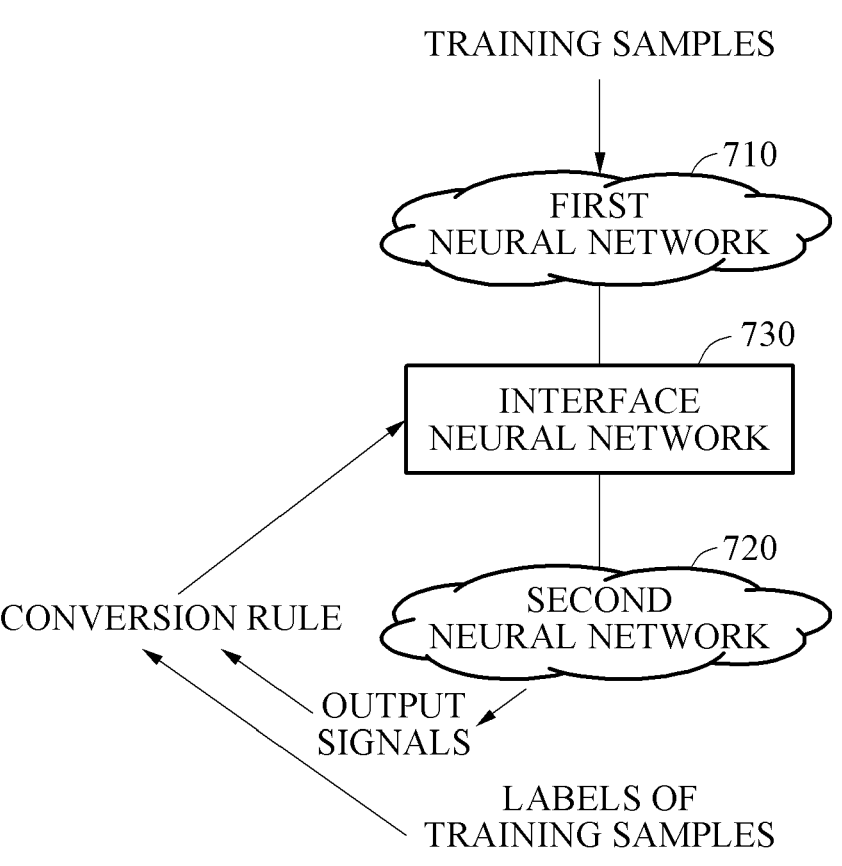
FIG. 7A is a flowchart illustrating a training method according to an example embodiment.
Figure 8:
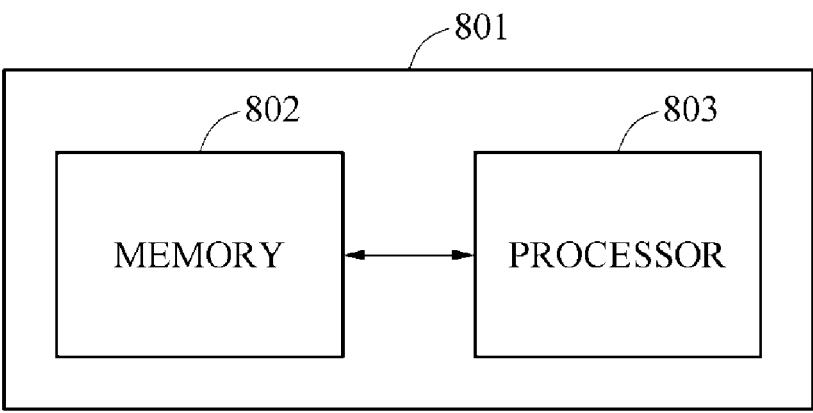

FIG. 7B is a diagram illustrating a training method according to an example embodiment; and FIG. 8 is a diagram illustrating a signal processing apparatus according to an example embodiment.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions may not be described in detail because they would obscure the description with unnecessary detail.

The terminology used herein is for the purpose of describing the example embodiments only and is not intended to be limiting of the disclosure. As used herein, the singular forms "a," "an," and "the" are intended to include the plural forms as well, unless the context clearly indicates otherwise. It will be further understood that the terms "include/comprise" and/or "have," when used in this disclosure, specify the presence of stated features, integers, steps, operations, elements, components, or combinations thereof, but do not preclude the presence or addition of one or more other features, integers, steps, operations, elements, components, and/or groups thereof. In addition, the terms such as "unit," "-er (-or)," and "module" described in the specification refer to an element for performing at least one function or operation, and may be implemented in hardware, software, or the combination of hardware and software.

Terms such as first, second, A, B, (a), (b), and the like may be used herein to describe components. Each of these terminologies is not used to define an essence, order or sequence of a corresponding component but used to distinguish the corresponding component from other component(s). For example, a first component may be referred to a second component, and similarly the second component may also be referred to as the first component.

If it is described in the specification that one component is "connected," "coupled," or "joined" to another component, a third component may be "connected," "coupled," and "joined" between the first and second components, although the first component may be directly connected, coupled or joined to the second component.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Example embodiments to be described hereinafter may be embodied in various forms of products, for example, a personal computer (PC), a laptop computer, a tablet PC, a smartphone, a television (TV), a smart home appliance, an intelligent vehicle, a kiosk, and a wearable device. For example, the example embodiments may be applicable to user recognition in, for example, a smartphone, a mobile device, and a smart home system. In addition, the example embodiments may be applicable to a payment service based on user recognition. Further, the example embodiments may also be applicable to a smart vehicle system that is automatically started through user recognition.

Example embodiments to be described hereinafter may use an interface neural network. The interface neural network refers to a neural network that connects, for example, two or more systems, modules, and networks. The systems, modules, and networks may operate independently from one another. The systems, modules, and networks may perform functions at the same levels, or perform functions at a relatively higher or lower level. The systems, modules, and networks may operate based on respective training-based parameters. The example embodiments may provide technology for training only the interface neural network without training an entire system, although the two or more systems, modules, and networks are connected.

The interface neural network may be trained based on a preset training set, or trained based on a trial and error based experience. The interface neural network may include a feedforward net. For example, the interface neural network may include a fully-connected net in a single layer or a multilayer. Alternatively, the interface neural network may include a stateful network. For example, the interface neural network may include a recurrent neural network.

Hereinafter, for convenience of description, scenarios that the interface neural network connects a first neural network and a second neural network will be described. However, modifications may be made to such scenarios so that the interface neural network connects, for example, various systems, modules, and networks. For example, the interface neural network may connect an existing system and a new module. The existing system may operate based on a parameter trained to be suitable for a user, and the new module may operate based on a parameter trained to be suitable for a function of the module. According to example embodiments, even in such a case that the new module is connected to the existing system, training only the interface neural network may be needed without training an entire system again.

FIG. 1 is a flowchart illustrating an operation method of a neural network, according to an example embodiment.

An operation method of a neural network to be described with reference to FIG. 1 may be performed by a signal processing apparatus. The signal processing apparatus may be embodied by a software module, a hardware module, or a combination thereof.

According to an example embodiment, the signal processing apparatus may receive a signal output from a first neural network, generate a new signal by processing the received signal, and transmit the generated signal to a second neural network. Here, the first neural network may receive a first input signal, and generate a first output signal by processing the received signal. The second neural network may receive a second input signal, and generate a second output signal by processing the received signal.

Referring to FIG. 1, in operation 101, the signal processing apparatus receives the first output signal output from the first neural network. In operation 102, the signal processing apparatus converts a feature included in the first output signal to a feature suitable for an input of the second neural network based on a conversion rule that controls conversion between a first feature to be output from the first neural network and a second feature to be input to the second neural network. In operation 103, the signal processing apparatus generates the second input signal corresponding to the second neural network based on the feature obtained from the conversion.

The conversion rule between the first feature to be output from the first neural network and the second feature to be input to the second neural network refers to a rule for changing the feature included in the first output signal and processing the feature to be a signal that may be processed by the second neural network. Using such a predefined conversion rule, the signal processing apparatus may provide an interface that enables compatibility between the first neural network and the second neural network that handle different types of signals.

The signal processing apparatus may load the conversion rule from an internal or external memory or a server, perform the conversion on the feature of the first output signal, and generate the second input signal suitable for the input of the second neural network. Alternatively, the signal processing apparatus may receive, from the internal or external memory or the server, information associated with an output of the first neural network and information associated with the input of the second neural network, and generate the conversion rule between the two neural networks. Here, the conversion rule may not be limited to a rule defined between the output of the first neural network and the input of the second neural network, but various modifications may be made. For example, the conversion rule may include parameters of the interface neural network.

The conversion rule may be defined or generated by any one or any combination of parameters of the interface neural network, the parameters including a structure of an input or output layer of at least one neural network connected to the signal processing apparatus, a type of input or output data, a dimension of an input or output vector, and a modality of an input or output. However, information used to define or generate the conversion rule for compatibility among a plurality of neural networks may not be limited to the foregoing.

According to an example embodiment, the signal processing apparatus may adapt the first feature to be output from the first neural network to the second feature to be input to the second neural network. The signal processing apparatus may change the feature included in the first output signal output from the first neural network and generate the second input signal to be input to the second neural network. Here, the first output signal may be a feature vector to be output from the first neural network, and the second input signal may be a feature vector to be input to the second neural network.

For example, the second neural network may be an upper neural network that is trained to perform an operation. In such an example, the signal processing apparatus may change the feature included in the first output signal of the first neural network, which is a lower neural network, to be suitable for the operation to be performed by the second neural network, using the interface neural network. The second neural network may perform the operation based on the second input signal generated through the conversion of the feature included in the first output signal.

The signal processing apparatus may convert the feature included in the first output signal to the feature of a form that may be processed by the second neural network, and generate the second input signal. To generate the second input signal, the signal processing apparatus may use the interface neural network to convert the feature of the first output signal to the feature corresponding to the input of the second neural network, and the interface neural network may apply the conversion rule for the conversion. For the conversion of the feature included in the first output signal, elements, for example, a type of the feature corresponding to the second neural network, an order in which features are input, and a location at which the feature is input, may be applied. The signal processing apparatus may convert the feature included in the first output signal to the feature corresponding to the input of the second neural network, using the conversion rule to which such elements are applied, and the second neural network may operate based on the feature obtained through the conversion. For example, the second neural network may recognize a pattern of the feature obtained through the conversion and generate a result of the recognition.

In operation 104, the signal processing apparatus transmits the second input signal to the second neural network. The first output signal output from the first neural network may not be a signal that is suitable for being input data of the second neural network, and thus the signal processing apparatus may perform the conversion on the feature included in the first output signal to generate the second input signal. The signal processing apparatus may transmit, to the second neural network, the second input signal generated corresponding to the input of the second neural network. For example, the second input signal may match an input layer of the second neural network, and be generated based on a type of a signal that is processed by the second neural network.

Figure 2:
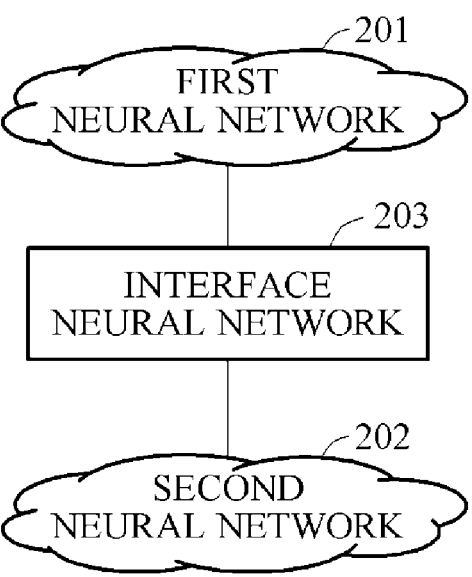
FIG. 2 is a conceptual diagram illustrating an interface neural network according to an example embodiment.

FIG. 2 is a conceptual diagram illustrating an interface neural network according to an example embodiment.

Neural networks may be applicable to various technical fields in everyday life. Numerous types of devices and software applications that operate based on neural network technology, and robots embodied by a combination thereof, may also be applicable to various fields. According to an example embodiment, an apparatus including a plurality of neural networks may provide functions through interactions performed by the neural networks being connected to one another.

The neural networks may be hierarchically embodied. For example, a lower neural network may extract a feature using information obtained from a sensor at an end of the apparatus including the neural networks, and an upper neural network may identify an object based on the extracted feature. Alternatively, the upper neural network may generate a determination result based on input information and generate a control command based on the generated determination result, and the lower neural network may operate in response to the control command received from the upper neural network.

According to an example embodiment, each of the neural networks may process an input signal based on a designed intention, and generate an output signal. Examples of a neural network may include a sensory feature extractor, a modality specific encoder and decoder, a memory, and a motor controller.

In an entire network system into which the neural networks are integrated, a neural network may be replaced with another neural network or added. For example, one among the neural networks may be replaced with a neural network of which performance is improved or a neural network of which a modality corresponds to a different sensor. Also, a neural network that may process a new type of an input or output signal that may be added.

A plurality of neural networks integrated with a sensor or motor having an improved performance may be provided in an off-the-shelf form by various vendors. For example, when one among neural networks included in an entire network system is a convolutional neural network (CNN) integrated with a vision sensor to detect a feature, a new type of sensor may be integrated with the CNN, or the CNN may be replaced with a neural network having the same sensor with an improved performance.

When a new neural network is integrated into the entire network system, the entire network system integrated with the new neural network may need to be trained, while a state of the previous entire network system is being maintained. However, if the entire network system integrated with the new neural network needs to be trained overall, retraining each neural network may be needed for connection among the neural networks included in the entire network system, and thus a loss of previously trained information may occur.

Referring to FIG. 2, an entire network system including a plurality of neural networks includes a first neural network 201, a second neural network 202, and an interface neural network 203. The interface neural network 203 connects the first neural network 201 and the second neural network 202. The first neural network 201 and the second neural network 202 may be independently trained, and the interface neural network 203 may be embodied based on information associated with a relationship between the first neural network 201 and the second neural network 202 for compatibility between the first neural network 201 and the second neural network 202.

According to an example embodiment, a conversion rule that controls conversion between an output of the first neural network 201 and an input of the second neural network 202 may be applied to the interface neural network 203. A first output signal output from the first neural network 201 may be converted to a second input signal corresponding to the second neural network 202 through the interface neural network 203 to which the conversion rule is applied. The conversion rule refers to a rule for processing a received signal by the interface neural network 203, and may be defined based on, for example, information associated with a protocol between the output of the first neural network 201 and an input of the interface neural network 203 and information associated with a protocol between an output of the interface neural network 203 and the input of the second neural network 202.

The conversion rule may include information that matches output vectors defined by the output of the first neural network 201 to input vectors defined by the input of the second neural network 202. Although a protocol is not defined between the first neural network 201 and the second neural network 202, data may be exchanged therebetween via the interface neural network 203.

For example, when one among the first neural network 201 and the second neural network 202 connected to the interface neural network 203 is replaced with a new neural network, the interface neural network 203 may connect the new neural network to the existing neural network. When either one or both of the first neural network 201 and the second neural network 202 is replaced with the new neural network, the signal processing apparatus may update the conversion rule of the interface neural network 203. To connect the new neural network and the existing neural network, the interface neural network 203 may optimize parameters of the interface neural network 203 and learn the optimized parameters. For example, when the second neural network 202 is replaced with a fourth neural network, the signal processing apparatus may update the conversion rule to be a conversion rule that controls conversion between the first feature to be output from the first neural network 201 and a fourth feature to be input to the fourth neural network. In this case, the signal processing apparatus may adjust parameters of the interface neural network 203 based on a relationship between the first feature and the fourth feature. Here, the fourth neural network and the second neural network 202 may be distinguished with respect to any one or any combination of an input or output modality, an input or output dimension, and an input or output feature. Further, a type of a first output signal based on the updated conversion rule may be identical to a type of the first output signal based on the previous conversion rule.

In the entire network system into which the new neural network is integrated, the interface neural network 203 may be solely trained, and remaining neural networks excluding the interface neural network 203 may maintain previous states.

Although a unilateral data flow between two neural networks connected to an interface neural network is illustrated in FIG. 2, examples provided herein may include bilateral transmission and reception of a signal between neural networks connected through an interface neural network, using a method of integrating signals received from a plurality of neural networks, processing the integrated signals to be a new signal, and transmitting the signal obtained through the processing to another neural network. According to an example embodiment, an interface neural network may connect at least two neural networks for compatibility therebetween, various modifications may be made to a form in which the neural networks are connected to the interface neural network, and the form may not be limited to examples described herein.

Figure 3:
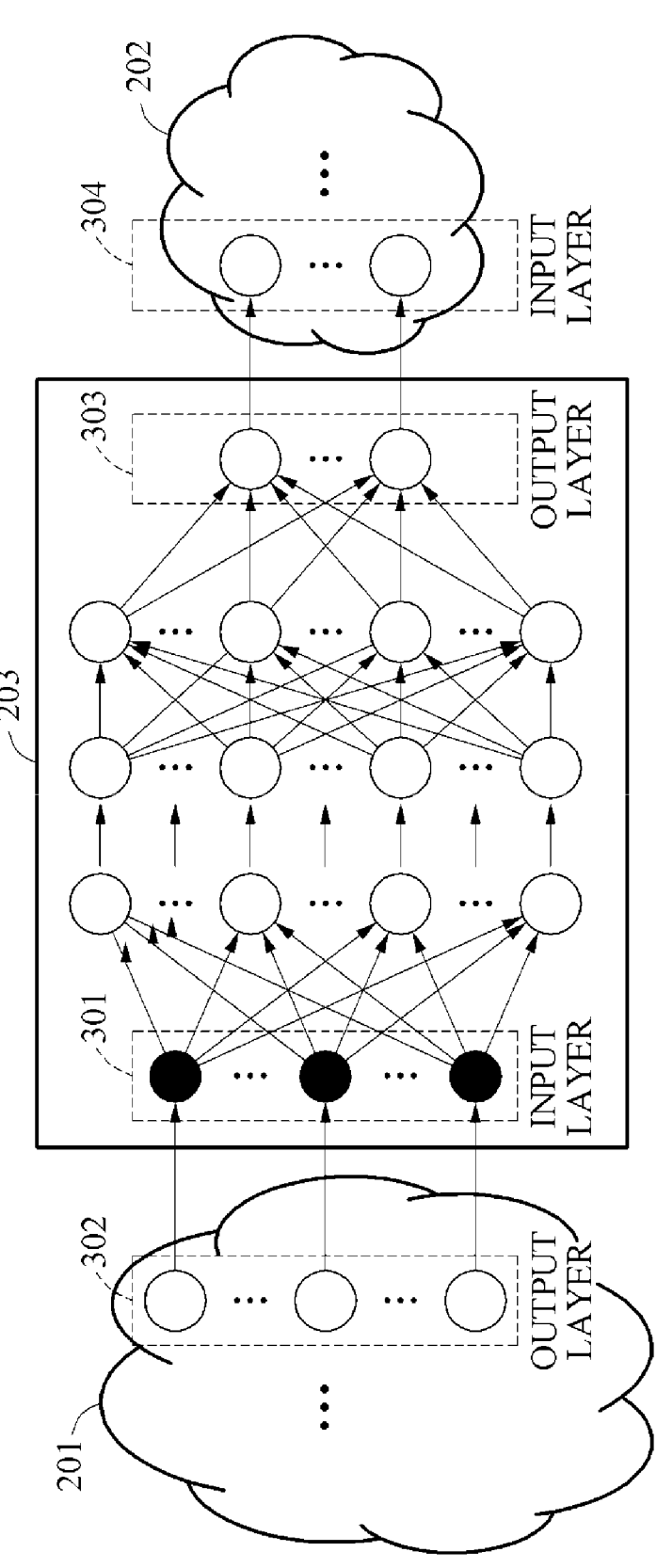
FIG. 3 is a diagram illustrating an interface neural network according to an example embodiment.

FIG. 3 is a diagram illustrating an interface neural network according to an example embodiment.

Referring to FIG. 3, the interface neural network 203 includes an input layer 301 and an output layer 303. According to an example embodiment, the input layer 301 of the interface neural network 203 receives a first output signal from an output layer 302 of the first neural network 201. To receive the first output signal, the input layer 301 of the interface neural network 203 matches the output layer 302 of the first neural network 201. For example, a dimension (e.g., a number of nodes) of the input layer 301 of the interface neural network 203 may correspond to a dimension (e.g., a number of nodes) of the output layer 302 of the first neural network 201.

The output layer 303 of the interface neural network 203 transmits a second input signal to an input layer 304 of the second neural network 202. To transmit the second input signal, the output layer 303 of the interface neural network 203 matches the input layer 304 of the second neural network 202. For example, a dimension (e.g., a number of nodes) of the output layer 303 of the interface neural network 203 may correspond to a dimension (e.g., a number of nodes) of the input layer 304 of the second neural network 202.

A topology of neurons in the interface neural network 203 may be embodied to easily convert a first output received by the input layer 301 to a second input to be transmitted by the output layer 303. For example, a conversion rule that controls conversion between an output of the first neural network 201 and an input of the second neural network 202 may include topology information of the neurons included in the interface neural network 203, a weighted value of each of the neurons, and information on connections among the neurons, and the interface neural network 203 may be defined based on the conversion rule.

According to an example embodiment, when a neural network connected to the interface neural network 203 is replaced with a new neural network or a new neural network is additionally connected, either one or both of the input layer 301 and the output layer 303 of the interface neural network 203 may be transformed to match an input or output layer of the new neural network, and a conversion rule for connecting the existing neural network and the new neural network may be generated or updated. In such a case, the topology information included in the conversion rule defining the interface neural network 203 may be updated. The interface neural network 203 may process a signal between the existing neural network and the new neural network based on the new conversion rule, and may connect the existing neural network and the new neural network.

Although an example of presence of an input layer and an output layer of a neural network is described with reference to FIG. 3, the input layer and the output layer of the neural network may not be separately present, and an interface neural network may be designed to match any one or any combination of an output and an input of a first neural network and an output and an input of a second neural network.

Figure 4A:
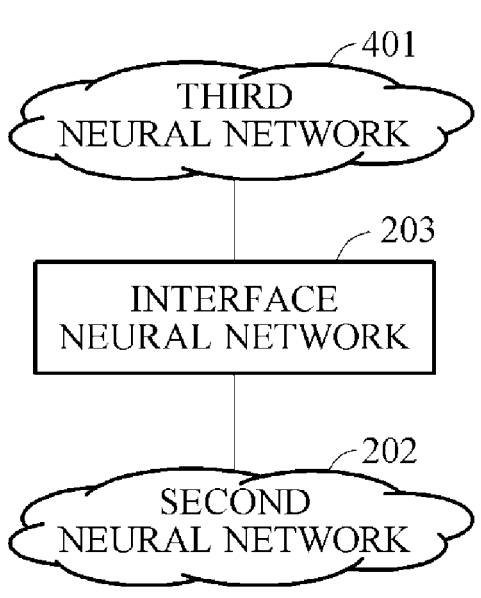
FIGS. 4A and 4B are conceptual diagrams illustrating an interface neural network to which a new neural network is connected, according to example embodiments.
Figure 4B:
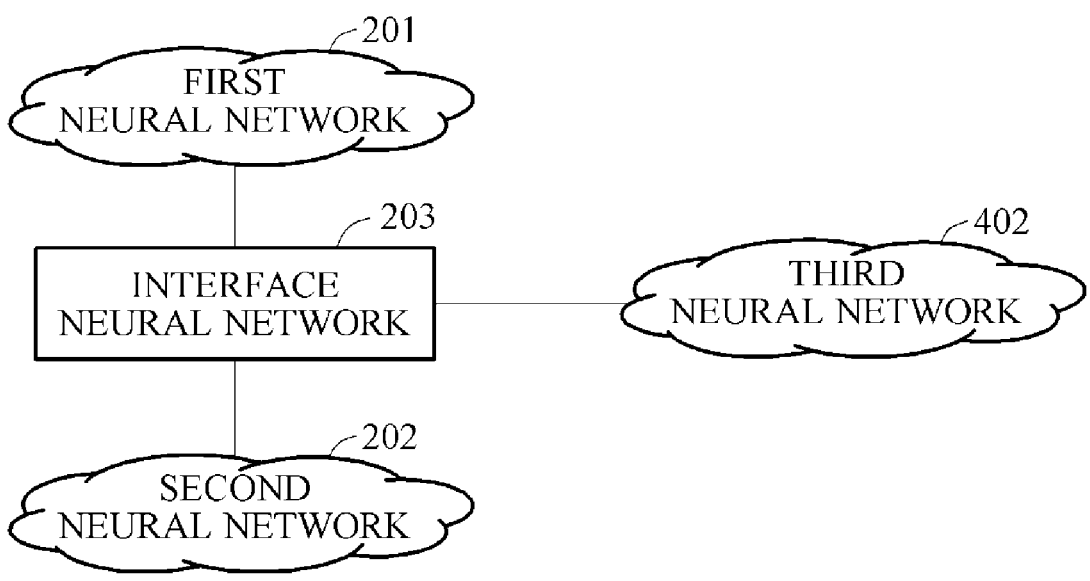

FIGS. 4A and 4B are conceptual diagrams illustrating an interface neural network to which a new neural network is connected, according to example embodiments.

Referring to FIG. 4A, when the first neural network 201 connected to the interface neural network 203 is replaced with a third neural network 401, a conversion rule of the interface neural network 203 may be updated. According to an example embodiment, a signal processing apparatus may update the conversion rule of the interface neural network 203 to a new conversion rule that controls conversion between an output of the third neural network 401 and an input of the second neural network 202. The signal processing apparatus may adjust parameters of the interface neural network 203 based on a relationship between the output of the third neural network 401 and the input of the second neural network 202. The signal processing apparatus may update the previous conversion rule to the new conversion rule that is optimized for the relationship between the output of the third neural network 401 and the input of the second neural network 202 based on the adjusted parameters.

A type of a second input signal to be transmitted to the second neural network 202 from the interface neural network 203 before the first neural network 201 is replaced with the third neural network 401 may be identical to a type of a second input signal to be transmitted to the second neural network 202 from the interface neural network 201 after the first neural network 201 is replaced with the third neural network 401. For example, types of features each included in the second input signals to be transmitted from the interface neural network 203 before and after the replacement may be the same.

Here, the second neural network 202 may be an upper neural network of an entire network system, and the first neural network 201 and the third neural network 401 may be a lower neural network in the entire network system. In such a case, the interface neural network 203 may provide a signal of the same type, for example, a feature of the same type, to the second neural network 202 before and after the replacement. The first neural network 201 and the third neural network 401 may be different from each other in any one or any combination of an input modality, an output modality, an input dimension, an output dimension, a feature included in an input signal, and a feature included in an output signal. Although types of features included in signals to be received by the interface neural network 203 from the lower neural network before and after the replacement are different, the interface neural network 203 may convert a feature included in an output signal of the third neural network 401 to a feature in a form that may be processed by the second neural network 202, which is the upper neural network. The interface neural network 203 may convert the feature included in the output signal of the third neural network 401 to the feature corresponding to the second neural network 202, and transmit, to the second neural network 202, the signal of the same type before and after the replacement.

Although the first neural network 201 is replaced with the third neural network 401 in the entire network system including the first neural network 201, the second neural network 202, and the interface neural network 203, the second neural network 202 connected to the interface neural network 203 may receive the second input signal of the same type before and after the replacement. Further, when the second neural network 202 is replaced with the fourth neural network, it can be applied to the exemplary embodiments described above. Thus, only training the interface neural network 203 connected to a new neural network may be performed without requiring retraining of the neural networks in the entire network system, and thus stability of the entire network system may be ensured.

Referring to FIG. 4B, a third neural network 402 may be additionally connected to the interface neural network 203. The signal processing apparatus may generate a conversion rule that controls conversion between an input or output of the third neural network 402 and an input or output of the second neural network 202. In addition, the signal processing apparatus may generate a conversion rule that controls conversion between the input or output of the third neural network 402 and an input or output of the first neural network 201. The signal processing apparatus may apply the generated conversion rule to the interface neural network 203.

According to an example embodiment, when the third neural network 402 is additionally connected to the interface neural network 203, the interface neural network 203 may receive a signal output from each of the first neural network 201 and the third neural network 402, and generate a second input signal based on the newly generated conversion rule and each of the received signals. The generated second input signal may be transmitted to the second neural network 202 from the interface neural network 203. For example, in an entire network system, the first neural network 201 and the third neural network 402 may be a lower neural network, and may have different modalities from each other. The second neural network 202 may be an upper neural network that may make a final determination and generate a command using a signal received from the interface neural network 203. The first neural network 201 and the third neural network 402 of the different modalities may extract respective features from objects, and the interface neural network 203 may receive each of the features received from the first neural network 201 and the third neural network 402. The interface neural network 203 may generate the second input signal based on the respective received features and the conversion rule, and the second neural network 202 may make a determination and generate a command after receiving the second input signal from the interface neural network 203. Here, types of the second input signals received by the second neural network 202 from the interface neural network 203 before and after the addition of the third neural network 402 may be the same.

Figure 5:
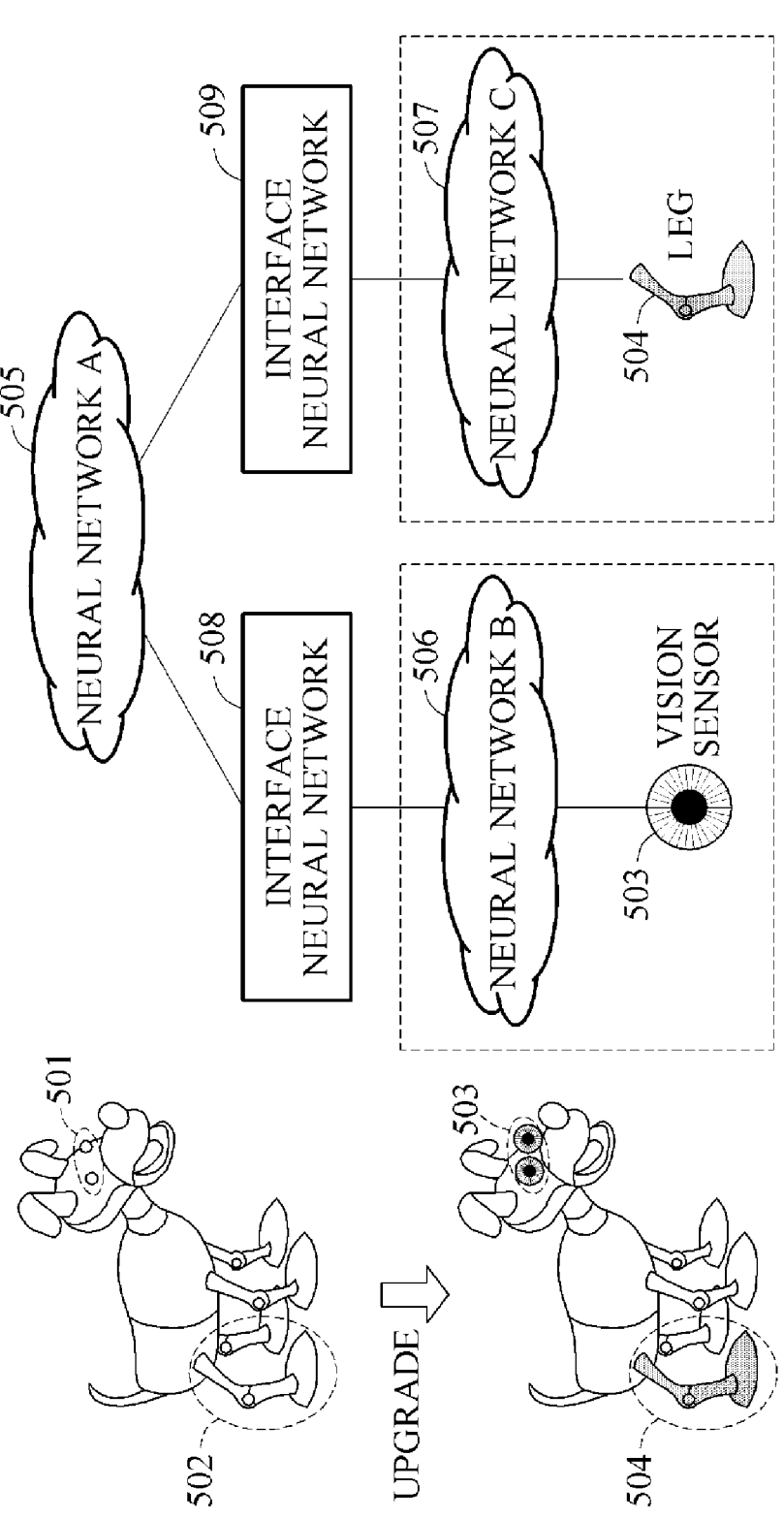
FIG. 5 is a diagram illustrating replacement of a neural network, according to an example embodiment.

FIG. 5 is a diagram illustrating replacement of a neural network, according to an example embodiment.

Referring to FIG. 5, an entire network system includes a neural network A 505, interface neural networks 508 and 509, a new neural network B 506, and a new neural network C 507. Here, the entire network system may be a robot system. The robot system may include a plurality of hierarchically connected neural networks, and the interface neural networks 508 and 509 may connect the neural networks.

As illustrated in FIG. 5, an existing vision sensor 501 and an existing actuator 502 are replaced or upgraded with a new vision sensor 503 and a new actuator 504, respectively. The new vision sensor 503 may have an improved performance compared to the existing vision sensor 501. Similarly, the new actuator 504 may have an improved performance compared to the existing actuator 502. The new vision sensor 503 may generate information sensed from an object, and the neural network B 506 may generate a visual feature corresponding to the object based on the information generated by the new vision sensor 503. Here, the neural network B 506 may be a CNN that may be trained to generate the visual feature corresponding to the object, and may extract a favorable feature based on the improved performance of the new vision sensor 503. The new actuator 504 may be controlled by the neural network C 507. The neural network C 507 may be a neural network that may be connected to the new actuator 504 and trained to control the new actuator 504.

When two lower neural networks included in the robot system are replaced with the neural network B 506 and the neural network C 507, respectively, conversion rules of the interface neural networks 508 and 509 may be updated. For example, when lower neural networks included in the robot system are replaced with new neural networks, the interface neural networks 508 and 509 may be trained, and remaining neural networks excluding the trained interface neural networks 508 and 509, for example, the neural network A 505, the neural network B 506, and the neural network C 507, may maintain previous states. The robot system may minimize additional training by adoption of a new neural network using an interface neural network, for example, the interface neural networks 508 and 509.

Here, the interface neural network 508 may generate a conversion rule that controls conversion between an output of the neural network B 506 and an input of the neural network A 505, and update the previous conversion rule to be the generated conversion rule. The interface neural network 509 may generate a conversion rule that controls conversion between an output of the neural network A 505 and an input of the neural network C 507, and update the previous conversion rule to be the generated conversion rule.

The neural network B 506 may output a feature vector corresponding to the object based on the information sensed by the new vision sensor 503. The interface neural network 508 may convert the feature vector received from the neural network B 506 to an input signal corresponding to the neural network A 505 based on the updated conversion rule. The interface neural network 508 may transmit the input signal obtained through the conversion to the neural network A 505. The neural network A 505 may identify or classify the object based on the input signal received from the interface neural network 508.

The neural network A 505 may output a command vector of the new actuator 504 based on identification information of the object. The interface neural network 509 may convert the command vector received from the neural network A 505 to an input signal corresponding to the neural network C 507 based on the updated conversion rule. The neural network C 507 may receive the input signal obtained through the conversion from the interface neural network 509, and control the new actuator 504 based on the received input signal.

Figure 6:
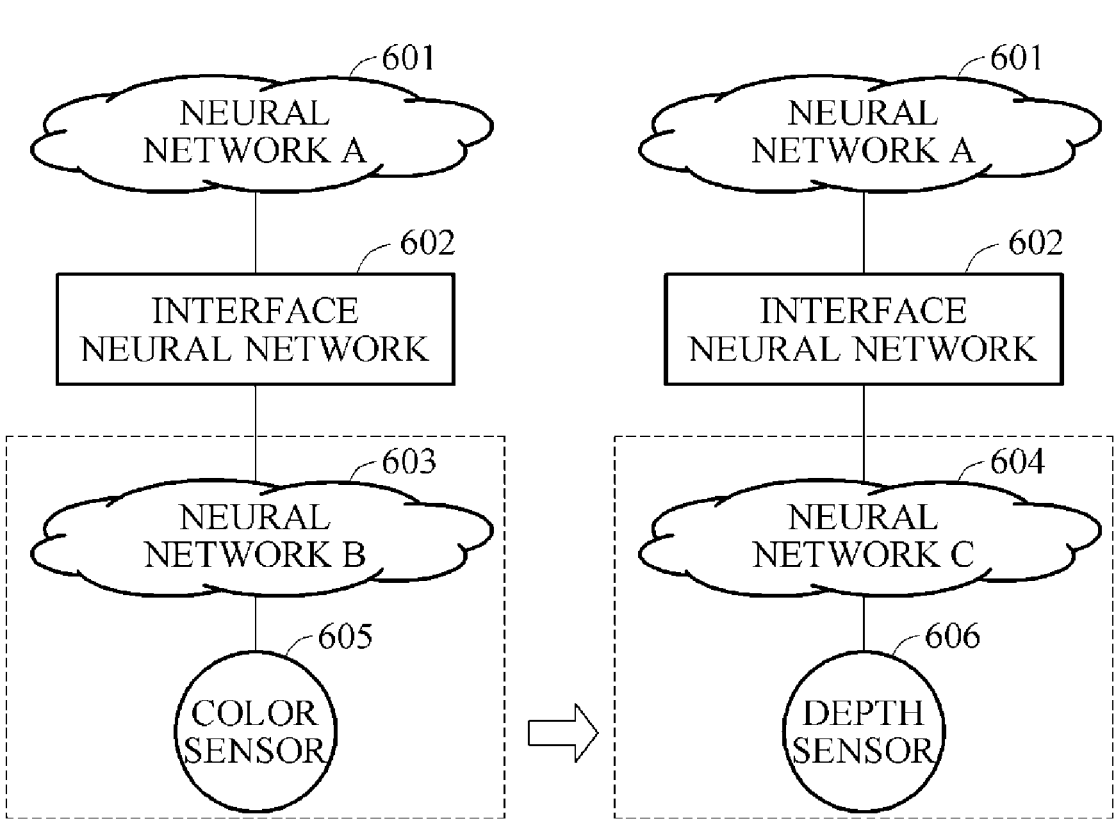
FIG. 6 is a diagram illustrating replacement of a neural network, according to another example embodiment.

FIG. 6 is a diagram illustrating replacement of a neural network, according to another example embodiment.

Referring to FIG. 6, in an entire network system including a neural network A 601 connected to an interface neural network 602, and a neural network B 603 connected to the interface neural network 602 and a color sensor 605, the neural network B 603 is replaced with a neural network C 604 connected to a depth sensor 606. The previous entire network system (illustrated in a left portion of FIG. 6) may use the color sensor 605 to identify or classify an object. When an environment of identifying an object changes, the depth sensor 606 may be used in place of the color sensor 605, and the entire network system adopting the depth sensor 606 (illustrated in a right portion of FIG. 6) may use a depth parameter to identify, classify, detect, or determine an object.

According to an example embodiment, when a sensor connected to a lower neural network included in an entire network system changes, a modality of the sensor may change. As described with reference to FIG. 5, when the neural network B 603 for a previous modality is replaced with the neural network C 604 for a new modality, the interface neural network 602 may update a conversion rule based on an output of the neural network C 604 and an input of the neural network A 601, and connect the neural network C 604 and the neural network A 601 based on the updated conversion rule.

FIG. 7A is a flowchart illustrating a training method according to an example embodiment. FIG. 7B is a diagram illustrating a training method according to an example embodiment.

Referring to FIGS. 7A and 7B, in operation 701, a signal processing apparatus connects an input layer of an interface neural network 730 to an output layer of a first neural network 710. The signal processing apparatus, which is described with reference to FIGS. 1 through 6, may perform an operation of processing a signal of the interface neural network 730, and the signal processing apparatus to be described with reference to FIGS. 7A and 7B may train the interface neural network 730. The trained interface neural network 730 may operate as described with reference to FIGS. 1 through 6.

In operation 702, the signal processing apparatus connects an output layer of the interface neural network 730 to an input layer of a second neural network 720. A dimension of the input layer of the interface neural network 730 may correspond to a dimension of the output layer of the first neural network 710, and a dimension of the output layer of the interface neural network 730 may correspond to a dimension of the input layer of the second neural network 720.

In operation 703, the signal processing apparatus inputs a training sample to an input layer of the first neural network 710. For example, the signal processing apparatus may sequentially input a plurality of training samples included in a training set to the input layer of the first neural network 710. Each of the training samples may include a label and correspond to a signal to be input to the first neural network 710. Label is information to identify training samples. In more detail, supervised learning is the machine learning task of inferring a function from labeled training data. The training data consist of a set of training samples. In supervised learning, each sample is a pair consisting of an input object (typically a vector) and a desired output value (also called the label).

In operation 704, the signal processing apparatus obtains an output signal to be output from an output layer of the second neural network 720 in response to the input of the training sample. For example, a result from propagation of the training sample from the first neural network 710 to the second neural network 720 through the interface neural network 730 may be output as the output signal of the second neural network 720.

In operation 705, the signal processing apparatus trains the interface neural network 730 based on the output signal and a label of the training sample. The signal processing apparatus may compare a target output signal based on the label of the training sample to the output signal output from the second neural network 720, and train the interface neural network 730 based on a result of the comparison. The signal processing apparatus may adjust parameters of the interface neural network 730 based on the output signal of the second neural network 720 and the label. Based on a parameter optimized through the adjusting, a conversion rule that controls conversion between an output of the first neural network 710 and an input of the second neural network 720 may be generated, and the interface neural network 730 may be defined based on the generated conversion rule.

FIG. 8 is a diagram illustrating a signal processing apparatus according to an example embodiment.

Referring to FIG. 8, a signal processing apparatus 801 includes a memory 802 and a processor 803. The memory 802 may store a program to be executed by the processor 803, and temporarily or permanently store data for processing performed by the processor 803. The processor 803 may receive a first output signal output from a first neural network, convert the first output signal to a second input signal corresponding to a second neural network based on a conversion rule that controls conversion between an output of the first neural network and an input of the second neural network, and transmit the second input signal to the second neural network. Examples described with reference to FIGS. 1 through 7B may be applicable to the signal processing apparatus 801, and thus a more detailed description will be omitted here.

The above-described example embodiments may be recorded in non-transitory computer-readable media including program instructions to implement various operations that may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules to perform the operations of the above-described example embodiments, or vice versa.

The foregoing example embodiments are examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An operation method of an interface neural network, the operation method comprising:

receiving, at an input layer of the interface neural network, an output signal from an output layer of a first neural network;

generating an input signal to be input to an input layer of a second neural network by converting a first feature vector of the output signal to a second feature vector of the input signal, based on parameters of the interface neural network controlling conversion between a feature vector to be output from the first neural network and a feature vector to be input to the second neural network; and transmitting, from an output layer of the interface neural network, the input signal to the input layer of the second neural network, wherein the operation method further comprises:

based on the first neural network being replaced with a third neural network, updating the parameters to control conversion between a feature vector to be output from the third neural network and the feature vector to be input to the second neural network; and based on the second neural network being replaced with a fourth neural network, updating the parameters to control conversion between the feature vector to be output from the first neural network and a feature vector to be input to the fourth neural network.

2. The operation method of claim 1, wherein an input dimension of the interface neural network corresponds to an output dimension of the first neural network, and an output dimension of the interface neural network corresponds to an input dimension of the second neural network.

3. The operation method of claim 1, wherein the parameters of the interface neural network are optimized.

4. The operation method of claim 1, wherein the updating the parameters to control the conversion between the feature vector to be output from the third neural network and the feature vector to be input to the second neural network comprises adjusting the parameters of the interface neural network, based on a relationship between the feature vector to be output from the third neural network and the feature vector to be input to the second neural network, and the updating the parameters to control the conversion between the feature vector to be output from the first neural network and the feature vector to be input to the fourth neural network comprises adjusting the parameters of the interface neural network, based on a relationship between the feature vector to be output from the first neural network and the feature vector to be input to the fourth neural network.

5. The operation method of claim 1, wherein the third neural network and the first neural network are distinguished with respect to any one or any combination of an input modality, an output modality, an input dimension, an output dimension, an input feature vector, and an output feature vector, and the fourth neural network and the second neural network are distinguished with respect to any one or any combination of an input modality, an output modality, an input dimension, an output dimension, an input feature vector, and an output feature vector.

6. The operation method of claim 1, wherein, based on the first neural network being replaced with the third neural network, a type of an input signal based on the updated parameters is identical to a type of the input signal based on the parameters, and based on the second neural network being replaced with the fourth neural network, a type of an output signal based on the updated parameters is identical to a type of the output signal based on the parameters.

7. The operation method of claim 1, further comprising, based on the third neural network being additionally connected to the interface neural network, generating the parameters controlling the conversion between the feature vector to be output from the third neural network and the feature vector to be input to the second neural network.

8. The operation method of claim 1, wherein the first neural network is configured to extract the first feature vector from an object, and the second neural network is configured to identify the object, based on the input signal.

9. The operation method of claim 1, wherein the first neural network is configured to determine, as the first feature vector, a command vector of an actuator, and the second neural network is configured to control the actuator, based on the input signal.

10. An operation method of an interface neural network, the operation method comprising:

receiving, at an input layer of the interface neural network, a first signal;

generating an input signal to be input to an input layer of a target neural network by converting a first feature vector of the first signal to a second feature vector of the input signal, based on parameters of the interface neural network controlling conversion between different feature vectors; and transmitting, from an output layer of the interface neural network, the input signal to the input layer of the target neural network, wherein the operation method further comprises:

based on the first signal being replaced with a second signal, updating the parameters to control conversion between a feature vector to be extracted from the second signal and the feature vector to be input to the target neural network; and based on the target neural network being replaced with a second neural network, updating the parameters to control conversion between the feature vector to be extracted from the first signal and a feature vector to be input to the second neural network.

11. The operation method of claim 10, wherein the parameters of the interface neural network are adjusted to control conversion between the feature vector to be extracted from the first signal and a feature vector to be input to the target neural network based on a relationship between the feature vector to be extracted from the first signal and the feature vector to be input to the target neural network.

12. The operation method of claim 10, wherein the updating the parameters to control the conversion between the feature vector to be extracted from the second signal and the feature vector to be input to the target neural network comprises adjusting the parameters of the interface neural network based on a relationship between the feature vector to be extracted from the second signal and the feature vector to be input to the target neural network, and the updating the parameters to control the conversion between the feature vector to be extracted from the first signal and the feature vector to be input to the second neural network comprises adjusting the parameters of the interface neural network, based on a relationship between the feature vector to be extracted from the first signal and the feature vector to be input to the second neural network.

13. The operation method of claim 10, wherein the second signal and the first signal are distinguished with respect to any one or any combination of a type and a dimension.

14. The operation method of claim 10, wherein, based on the first signal being replaced with the second signal, a type of the input signal generated based on the updated parameters is identical to a type of the input signal generated based on the parameters.

15. The operation method of claim 10, wherein an input dimension of the interface neural network corresponds to a dimension of the first signal, and an output dimension of the interface neural network corresponds to an input dimension of the target neural network.

16. A non-transitory computer-readable medium storing a program comprising instructions to control a processor to perform the method of claim 10.

17. A signal processing apparatus comprising:

at least one processor configured to:

receive, at an input layer of an interface neural network, an output signal from an output layer of a first neural network;

generate an input signal to be input to an input layer of a second neural network by converting a first feature vector of the output signal to a second feature vector of the input signal, based on parameters of the interface neural network controlling conversion between a feature vector to be output from the first neural network and a feature vector to be input to the second neural network; and transmit, from an output layer of the interface neural network, the input signal to the input layer of the second neural network, wherein the at least one processor is further configured to:

based on the first neural network being replaced with a third neural network, update the parameters to control conversion between a feature vector to be output from the third neural network and the feature vector to be input to the second neural network; and based on the second neural network being replaced with a fourth neural network, update the parameters to control conversion between the feature vector to be output from the first neural network and a feature vector to be input to the fourth neural network.

18. A signal processing apparatus comprising:

at least one processor configured to:

receive, at an input layer of an interface neural network, a first signal;

generate an input signal to be input to an input layer of a target neural network by converting a first feature vector of the first signal to a second feature vector of the input signal, based on parameters of the interface neural network controlling conversion between different feature vectors; and transmit, from an output layer of the interface neural network, the input signal to the input layer of the target neural network, wherein the at least one processor is further configured to:

based on the first signal being replaced with a second signal, update the parameters to control conversion between a feature vector to be extracted from the second signal and the feature vector to be input to the target neural network; and based on the target neural network being replaced with a second neural network, update the parameters to control conversion between the feature vector to be extracted from the first signal and a feature vector to be input to the second neural network.

19. An operation method of an interface neural network, the operation method comprising:

receiving, at an input layer of the interface neural network, a first feature vector from a first neural network, the first feature vector corresponding to an object based on an information generated by a first vision sensor;

converting the first feature vector to a second feature vector to be input to a second neural network, based on parameters of the interface neural network controlling conversion between a feature vector to be output from the first neural network and a feature vector to be input to the second neural network; and transmitting, from an output layer from the interface neural network, the second feature vector to the second neural network, wherein the interface neural network is independently trained when the first vision sensor is replaced with a second vision sensor having different performance, and wherein the operation method further comprises:

based on the first neural network being replaced with a third neural network corresponding to the second vision sensor, updating the parameters to control conversion between a feature vector to be output from the third neural network and the feature vector to be input to the second neural network.

20. The operation method of claim 19, wherein the interface neural network is trained independently of the third neural network corresponding to the second vision sensor and the second neural network.

21. The operation method of claim 19, wherein an input dimension of the interface neural network corresponds to an output dimension of the first neural network, and an output dimension of the interface neural network corresponds to an input dimension of the second neural network.

22. The operation method of claim 19, wherein the feature vector to be output from the third neural network corresponds to an object based on an information generated by the second vision sensor.

23. The operation method of claim 19, wherein the updating the parameters to control the conversion between the feature vector to be output from the third neural network and the feature vector to be input to the second neural network comprises adjusting the parameters of the interface neural network, based on a relationship between the feature vector to be output from the third neural network and the feature vector to be input to the second neural network.

24. A signal processing apparatus comprising:

a processor configured to:

receive, at an input layer of an interface neural network, an output signal comprising a first feature vector from an output layer of a first neural network, the first feature vector corresponding to an object based on an information generated by a first vision sensor;

convert the first feature vector of the output signal to a second feature vector of an input signal to be input to an input layer of a second neural network, based on parameters of the interface neural network controlling conversion between a feature vector to be output from the first neural network and a feature vector to be input to the second neural network;

generate the input signal to be input to the input layer of the second neural network, the input signal comprising the second feature vector; and transmit, from an output layer of the interface neural network, the input signal comprising the second feature vector to the input layer of the second neural network, wherein the interface neural network is independently trained when the first vision sensor is replaced with a second vision sensor having different performance, and wherein the processor is further configured to, based on the first neural network being replaced with a third neural network corresponding to the second vision sensor, update the parameters to control conversion between a feature vector to be output from the third neural network and the feature vector to be input to the second neural network.

25. The signal processing apparatus of claim 24, wherein the interface neural network is trained independently of the third neural network corresponding to the second vision sensor and the second neural network.

26. The signal processing apparatus of claim 24, wherein an input dimension of the interface neural network corresponds to an output dimension of the first neural network, and an output dimension of the interface neural network corresponds to an input dimension of the second neural network.

27. The signal processing apparatus of claim 24, wherein the feature vector to be output from the third neural network corresponds to an object based on an information generated by the second vision sensor.

28. The signal processing apparatus of claim 24, wherein the processor is further configured to:

update the parameters to control the conversion between the feature vector to be output from the third neural network and the feature vector to be input to the second neural network comprises adjusting the parameters of the interface neural network, based on a relationship between the feature vector to be output from the third neural network and the feature vector to be input to the second neural network.

* * * * *